(12) United States Patent
Parng

(10) Patent No.: US 10,244,304 B1
(45) Date of Patent: Mar. 26, 2019

(54) ATTACHMENTS FOR PERSONALIZING HEADPHONES

(71) Applicant: Michael Parng, New York, NY (US)

(72) Inventor: Michael Parng, New York, NY (US)

(*) Notice: Subject to any disclaimer, the term of this patent is extended or adjusted under 35 U.S.C. 154(b) by 640 days.

(21) Appl. No.: 14/719,169

(22) Filed: May 21, 2015

Related U.S. Application Data

(63) Continuation of application No. 13/481,801, filed on May 26, 2012.

(60) Provisional application No. 61/523,153, filed on Aug. 12, 2011.

(51) Int. Cl.
| | | |
|---|---|---|
| *H04R 1/10* | (2006.01) | |
| *H04R 5/033* | (2006.01) | |
| *B23P 23/00* | (2006.01) | |
| *B23P 17/04* | (2006.01) | |
| *B23P 11/00* | (2006.01) | |
| *B21K 21/16* | (2006.01) | |
| *A41D 1/00* | (2018.01) | |
| *B21D 39/00* | (2006.01) | |
| *B23P 11/02* | (2006.01) | |
| *B32B 37/12* | (2006.01) | |
| *A42B 1/06* | (2006.01) | |
| *A41D 27/08* | (2006.01) | |

(52) U.S. Cl.
CPC .......... *H04R 1/1058* (2013.01); *A41D 1/00* (2013.01); *A41D 27/08* (2013.01); *A42B 1/06* (2013.01); *B21D 39/00* (2013.01); *B21K 21/16* (2013.01); *B23P 11/00* (2013.01); *B23P 11/02* (2013.01); *B23P 17/04* (2013.01); *B23P 23/00* (2013.01); *B32B 37/12* (2013.01); *H04R 1/10* (2013.01)

(58) Field of Classification Search
CPC .......... B21K 21/16; B23P 17/04; B23P 11/00; B23P 23/00; B23P 11/02; B21D 39/00; A42B 1/06; A41D 27/08; A41D 1/00; B32B 37/12; H04R 1/10
USPC ............. 2/244.208, 209, 423; 181/128, 129; 455/575.2; 29/401.1, 428, 434, 453, 456, 29/458, 525.01, 557
See application file for complete search history.

(56) References Cited

U.S. PATENT DOCUMENTS

| | | |
|---|---|---|
| 5,581,627 A | 12/1996 | Bowser et al. |
| 5,832,098 A | 11/1998 | Chen |
| RE37,398 E | 10/2001 | Nageno |
| 6,606,506 B1 | 8/2003 | Jones |
| 6,751,328 B1 | 6/2004 | Lin |
| 6,888,950 B2 * | 5/2005 | Siskin ................ A61F 11/14 181/129 |

(Continued)

FOREIGN PATENT DOCUMENTS

| | | |
|---|---|---|
| JP | 2006-270907 | 10/2006 |
| JP | 3168940 | 6/2011 |
| WO | WO 02/054825 | 7/2002 |

OTHER PUBLICATIONS

U.S. Appl. No. 13/481,801 Final Office Action dated Dec. 22, 2014.

(Continued)

*Primary Examiner* — Sarang Afzali
*Assistant Examiner* — Darrell C Ford
(74) *Attorney, Agent, or Firm* — Polsinelli LLP

(57) ABSTRACT

Systems and methods for attaching or joining a personalization accessory to headphones, earphones, ear buds and listening devices that produce, enhance and/or cancel acoustics and go in, on, and/or over the ear.

13 Claims, 9 Drawing Sheets

(56) References Cited

U.S. PATENT DOCUMENTS

| | | | |
|---|---|---|---|
| 7,013,018 B2 | 3/2006 | Bogeskov-Jensen | |
| 7,206,429 B1 | 4/2007 | Vossler | |
| 7,212,645 B2 | 5/2007 | Le Gette et al. | |
| 7,512,414 B2* | 3/2009 | Jannard | G02C 11/06 |
| | | | 381/376 |
| 7,668,330 B2 | 2/2010 | Siskin et al. | |
| 7,853,034 B1 | 12/2010 | Gresko | |
| 8,320,603 B2 | 11/2012 | Bass | |
| 8,503,711 B2 | 8/2013 | Flynn | |
| 2006/0073787 A1 | 4/2006 | Lair et al. | |
| 2007/0036383 A1* | 2/2007 | Romero | H04R 1/1016 |
| | | | 381/380 |
| 2007/0160249 A1 | 7/2007 | Le Gette et al. | |
| 2007/0199133 A1 | 8/2007 | Bavetta et al. | |
| 2007/0201000 A1 | 8/2007 | Jackson et al. | |
| 2007/0291974 A1 | 12/2007 | Eisenbraun | |
| 2008/0311966 A1* | 12/2008 | Klein | H04M 1/05 |
| | | | 455/575.2 |
| 2009/0034774 A1 | 2/2009 | Lowry, Jr. | |
| 2009/0285436 A1 | 11/2009 | Lowry | |
| 2009/0323975 A1 | 12/2009 | Groesch | |
| 2010/0104126 A1 | 4/2010 | Greene | |
| 2010/0246879 A1 | 9/2010 | Siahaan et al. | |
| 2011/0216931 A1 | 9/2011 | Bui | |
| 2011/0235819 A1 | 9/2011 | Alden | |
| 2013/0003984 A1 | 1/2013 | Belafonte et al. | |
| 2013/0036597 A1 | 2/2013 | Parng | |
| 2013/0216085 A1* | 8/2013 | Honeycutt | H04R 1/028 |
| | | | 381/374 |
| 2014/0098983 A1* | 4/2014 | Clow | H04R 1/1091 |
| | | | 381/375 |
| 2014/0146978 A1 | 5/2014 | Yoo | |

OTHER PUBLICATIONS

U.S. Appl. No. 13/481,801 Office Action dated Jun. 2, 2014.
U.S. Appl. No. 13/481,801 Final Office Action dated Nov. 4, 2013.
U.S. Appl. No. 13/481,801 Office Action dated Jun. 20, 2013.

* cited by examiner 15A
15B 16A
16B 17A
17B 18A
18B

19A 20A
20B 21A
21B 22A
22B

ATTACHMENTS FOR PERSONALIZING HEADPHONES

CROSS REFERENCE TO RELATED APPLICATIONS

The present application is a continuation and claims the priority benefit of U.S. patent application Ser. No. 13/481,801 filed on May 26, 2012 and entitled "Attachments for Personalizing Headphones," which claims the priority benefit of U.S. provisional patent application Ser. No. 61/523,153, filed on Aug. 12, 2011, entitled "Earphone/Headphone/Ear Bud," the disclosures of which are hereby incorporated by reference herein.

BACKGROUND OF THE INVENTION

1. Field of the Invention

This invention generally relates to the hardware used to produce acoustics and typically is worn on the head and in or around the ear canal.

2. Description of the Related Art

The use of personal portable audio devices has increasingly become widespread due to developments in digital music storage and digital music players (e.g., iPods®). Music (and other audio) is generally considered a form of expression, whether it is the music that a user creates or the music that a user chooses to listen to. While users may express their unique personalities through the choice of music, the range of designs for devices and accessories used to listen to them has been limited.

There is, therefore, a need in the art for improved systems and methods by which users can customize their audio listening devices.

SUMMARY OF THE INVENTION

Embodiments of the presently claimed invention allow users to further personalize their audio listening product to represent their personality. Such personalization may be embodied in headphone/earphone units. Alternatively, pre-existing earphones, including custom-made earphones, may be retrofitted, so that users may add further personalization. The presently claimed invention includes a method for customizing a headphone/earphone and a headphone/earphone that may be personalized by attaching a permanent attachment feature and a remove-able personalization accessory.

The method of the invention includes providing a hole on a headphone that acts as a point of anchor for an attachment feature, providing an attachment feature, and providing a removable personalization accessory. The attachment feature may be permanently connected to the headphone, and the personalization feature may be connected to the attachment feature. The personalization accessory hangs vertically from the attachment feature when attached to the attachment feature and when worn by a person. The personalization accessory may be removed from the attachment feature.

The headphone/earphone includes an anchor point where an attachment feature may be permanently attached to the headphone/earphone. The personalization accessory hangs vertically from the attachment feature when attached to the attachment feature and when worn by a person. The personalization accessory may be removed from the attachment feature.

DETAILED DESCRIPTION OF THE DRAWINGS

Listening devices include headphones, earphone, ear buds, and any other personal listening device known in the art. Earphones and ear buds are typically configured to be secured in the ear canal, while the headphones are typically configured to rest on or over the ear. While the description may refer to one of the aforementioned listening devices embodiments of the present invention may be applied to any headphones, earphone, and ear buds, etc. Specifically, an attachment feature allows for personalization of the listening device. Personalization may include the addition of jewelry, art, chains, charms, jumpers, and other accessories.

Some embodiments include a method for modifying a pre-existing listening device. Such methods may include creating a cavity or tunnel in the body of the listening device. The tunnel may be sagittal, transverse, coronal or combination of all three planes. An attachment feature (e.g., a hoop) may be passed through the tunnel, thereby creating an anchor, bridge, or bar that will support but not be limited to supporting personalization accessories. Such attachments may include tunnels, posts, links, male-female connectors, bulb connectors, clasp connectors, hook connectors, snap connectors (e.g., ball & snap), polarized connectors, stud connectors, post connectors, plug connectors, metal eyelet connectors, interchangeable connectors, hybrid connectors, and other connection methods known in the art. The attachment feature may be any length, width, size, or color appropriate to the type of listening device. As noted above, attachment feature may also accommodate polarized materials with or without a cavity exposure for attachments, as well as accommodating threaded and screw on connectors.

Attachment features may be anchored to the listening device by means other than a tunnel. Adhesives, for example, may be used to attach an attachment feature to the listening device. Any anchoring means known in the art may be used as to create a point of attachment for the attachment feature. Alternatively, the attachment feature may be built or retrofitted into the structure of the listening device. For example, a listening device may be modified so as to create or expose a loop or hook to serve as the attachment feature for securing personalization accessories. The attachment feature may be place anywhere on the listening device (e.g., at the point of existing connections such as an earphone jack). In some embodiments, such attachment feature may allow for a daisy chain of materials to be attached.

Figure 1:
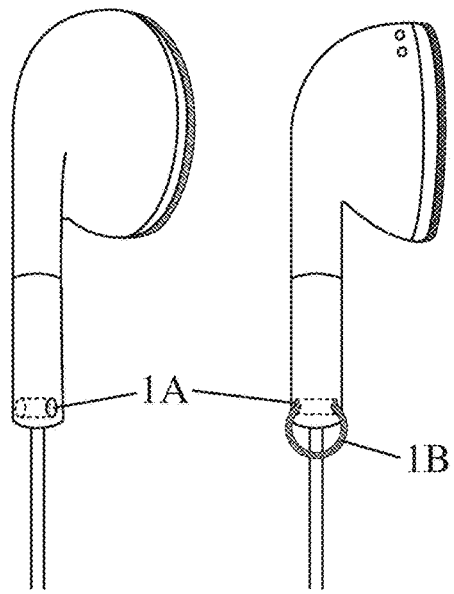
FIG. 1 is a side view of an earphone with a tunnel and an attachment feature.

FIG. 1 illustrates an exemplary tunnel and attachment feature. The hole (or tunnel) 1A allows for connection of an attachment feature 1B (e.g., ring or any other objects). Accessories, which may be associated with corresponding attachment feature (e.g., openable ring or hook) may therefore be connected to the attachment feature 1B.

Figure 2:
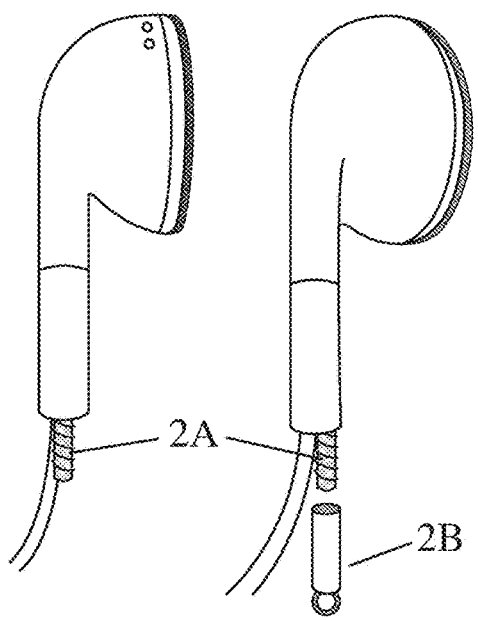
FIG. 2 is a side view of an earphone with a male-female connector.

FIG. 2 shows a male post 2A attaching to a female connector 2B. The male post 2A may be connected to the earphone via a cavity and/or adhesive. In FIG. 2, the male post 2A is illustrated as being threaded. While FIG. 2 illustrates the male post 2A being attached to the earphone, alternative embodiments may allow for a cavity (e.g., female connector 2B) to be formed in or in a piece attached to the earphone, allowing for male post 2A to be inserted (and/or screwed, threaded) into the cavity, such as that illustrated in FIG. 10. Similar to the attachment feature 1B illustrated in FIG. 1, the female connector 2B may be connected to an accessory with a corresponding attachment feature.

Figure 3:
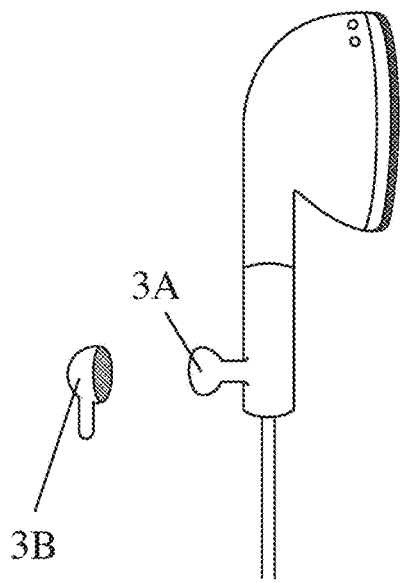
FIG. 3 is a side view of an earphone with a bulb connector.

FIG. 3 shows a male bulb connector 3A and a corresponding female connector is 3B. In the embodiment illustrated in FIG. 3, the male bulb 3A may have been cast as part of the earphone body. Alternative embodiments for connect the male bulb 3A to the earphone may include using adhesive, creating a cavity shaped to connect to a corresponding shape on the male bulb 3A, etc. The female connector 3B may be associated with an attachment feature (not illustrated) that allows the female connector 3B to connect to one or more accessories. Such attachment feature may be cast, molded, or otherwise attached to female connector 3B.

Figure 4:
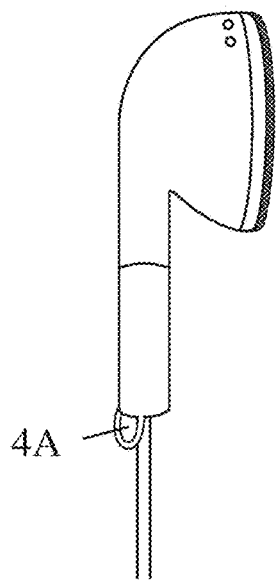
FIG. 4 is a side view of an earphone with a loop connector.

FIG. 4 illustrates a loop 4A cast as part of the earphone body. Additional embodiments may include loops that are injection molded, glued, or otherwise attached to the ear bud. Associations with accessories may occur as described with respect to the foregoing figures.

Figure 5:
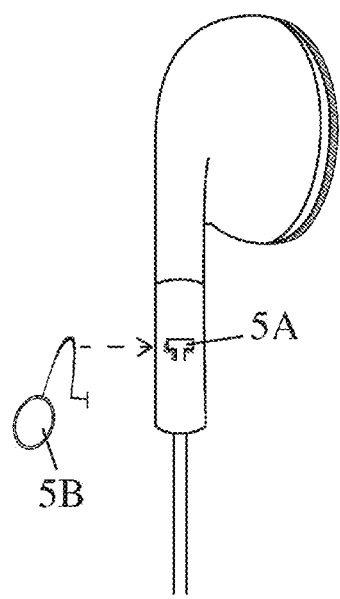
FIG. 5 is a side view of an earphone with a clasp connector.

FIG. 5 shows a cavity 5A accommodating a clasp connector 5B. The clasp 5B will allow attachment of one or more personalization accessories.

Figure 6:
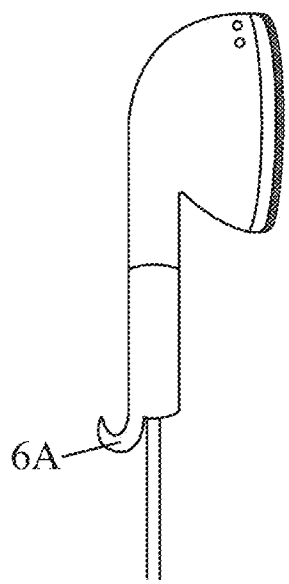
FIG. 6 is a side view of an earphone with a hook.

FIG. 6 illustrates a hook 6A cast as part of the earphone body.

Figure 7:
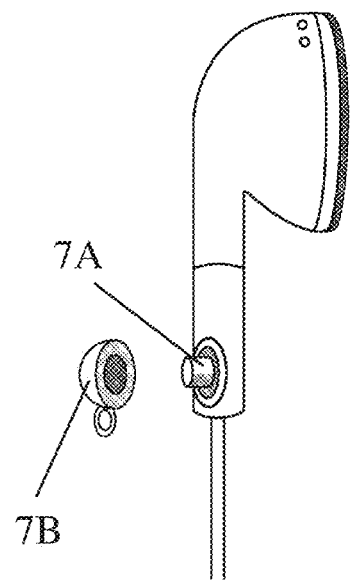
FIG. 7 is a side view of an earphone with a snap connector.

FIG. 7 shows a snap connection method that is similar to the bulb connector 3A of FIG. 3. Snap 7A may be attached or cast into the earphone and the connector 7B.

Figure 8:
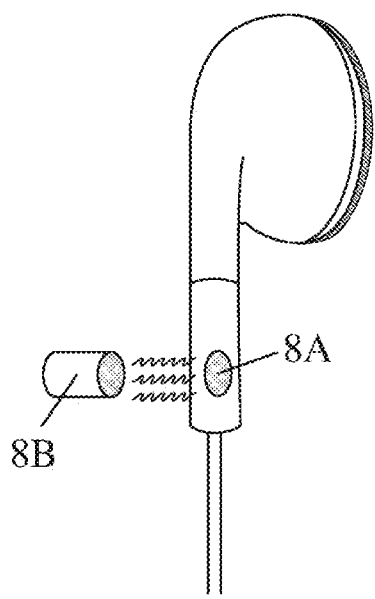
FIG. 8 is a side view of an earphone with a polarized connector.

FIG. 8 shows the use of a magnet or similar polarizable materials such as metal that polarized material can attract. Either one of 8A or 8B may be made of the magnet or polarizable material, while the other may be made of a metal attracted to the polarizable material.

Figure 9:
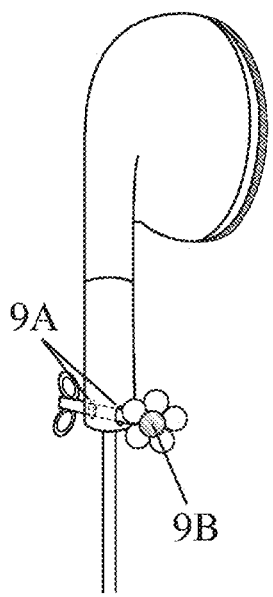
FIG. 9 is a side view of an earphone with a tunnel and a personalization accessory.

FIG. 9 shows a hole and/or tunnel 9A that allows the passing and securing of a post 9B that is already attached to a personalization accessory, in this case a flower shaped accessory.

Figure 10:
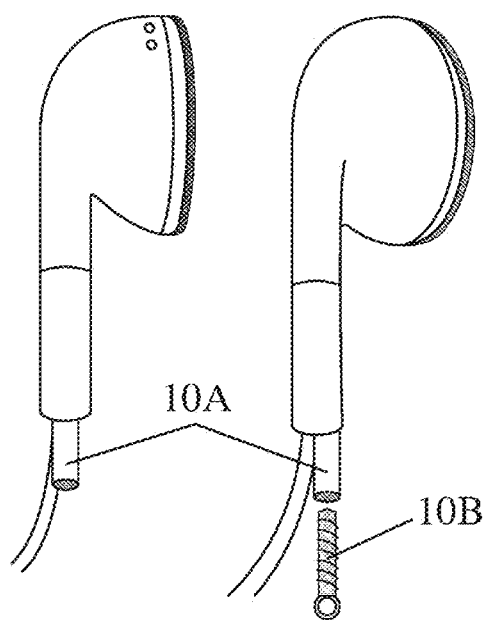
FIG. 10 is a side view of an earphone with an alternative male-female connector.

FIG. 10 illustrates the converse of the male-female connector illustrated in FIG. 2. The female 10A is attached to the earphone. The male 10B is illustrated as being threaded.

Figure 11:
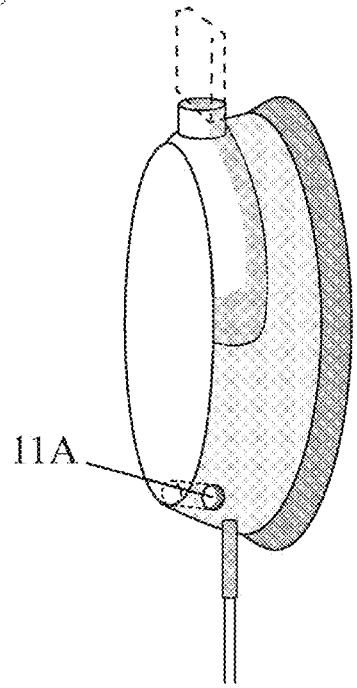
FIG. 11 is a side view of a headphone with a tunnel.

FIG. 11 illustrates a headphone with a tunnel 11A will allow for connection of an attachment feature.

Figure 12:
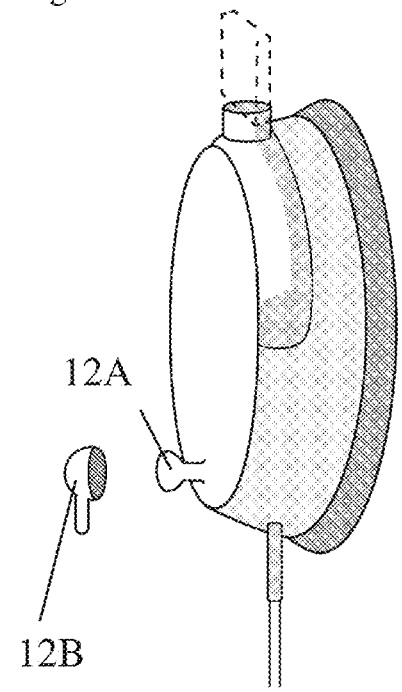
FIG. 12 is a side view of a headphone with a bulb connector.

FIG. 12 shows a male bulb connector 12A cast into the mold of the headphone and corresponding female connector 12B.

Figure 13:
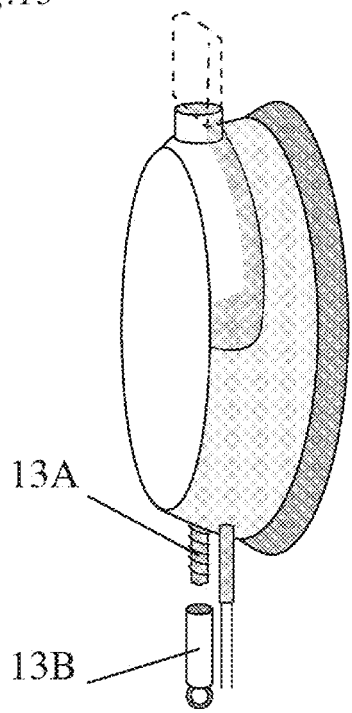
FIG. 13 is a side view of a headphone with a male-female connector.

FIG. 13 shows a threaded male post 13A attaching to a female 13B.

Figure 14:
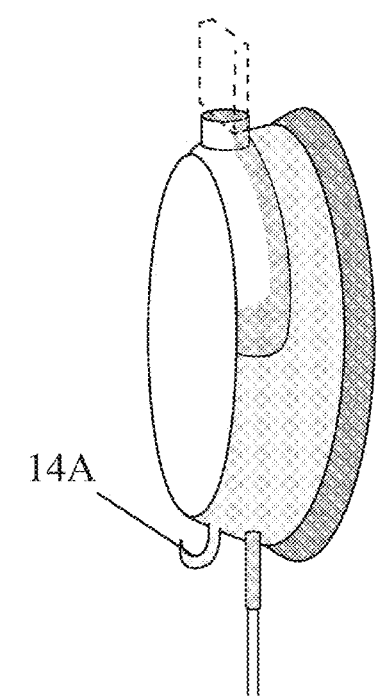
FIG. 14 is a side view of a headphone with a hook.

FIG. 14 illustrates a hook 14A cast as part of the headphone body.

Figure 15:
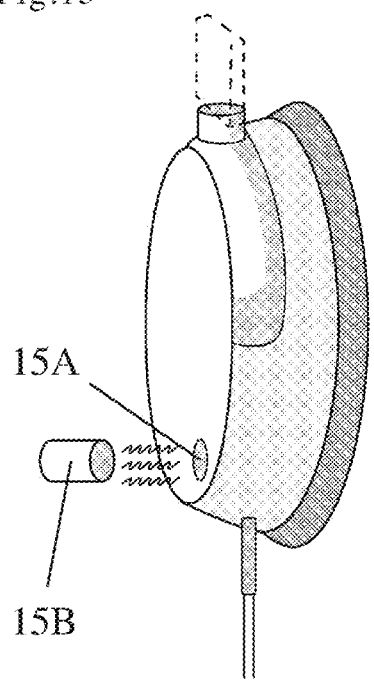
FIG. 15 is a side view of a headphone with a polarized connector.

FIG. 15 shows the use of a magnet or similar polarizable materials such as metal that polarized material can attract. Either one of 15A or 15B may be made of the magnet or polarizable material, while the other may be made of a metal attracted to the polarizable material.

Figure 16:
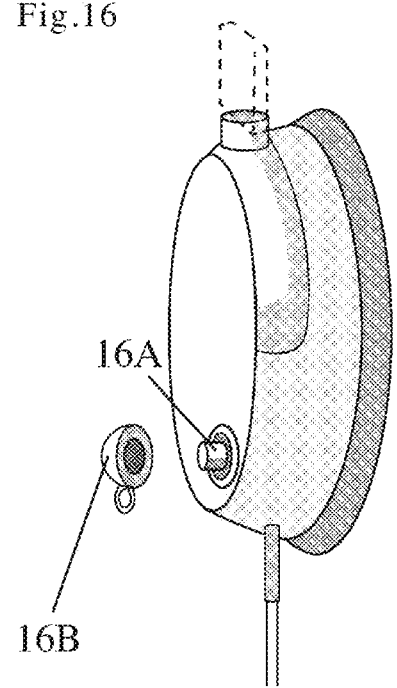
FIG. 16 is a side view of a headphone with a snap connector.

FIG. 16. shows the snap connection method that is similar to the bulb connector 3A of FIG. 3. The snap 16A is attached or cast as part of the headphone body and the corresponding snap connector 16B.

Figure 17:
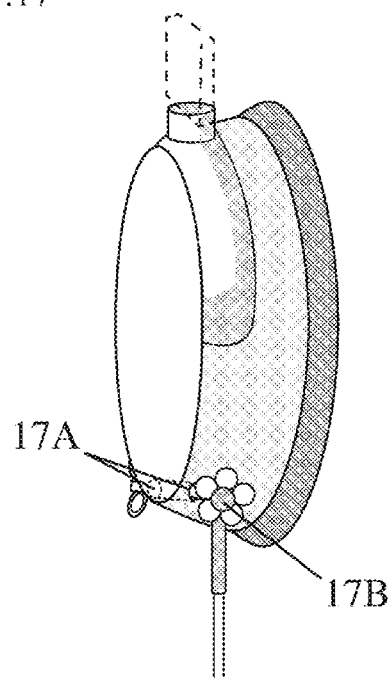
FIG. 17 is a side view of a headphone with a tunnel and a personalization accessory.

FIG. 17 shows the hole and/or tunnel 17A that allows the passing and securing of a post 17B attached to a flower-shaped personalization accessory.

Figure 18:
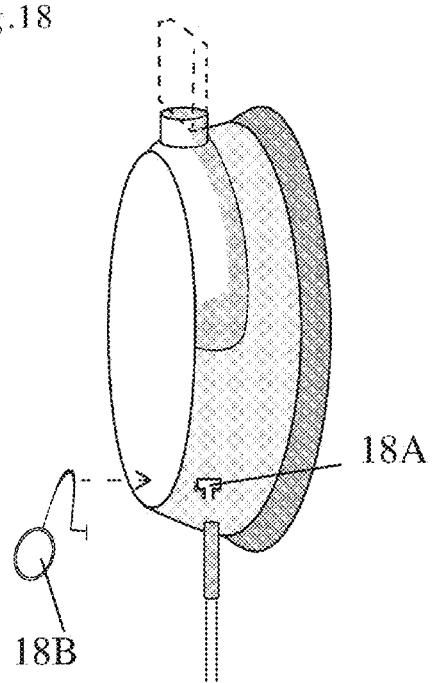
FIG. 18 is a side view of a headphone with a clasp connector.

FIG. 18 shows cavity 18A accommodating a corresponding clasp connector 18B. The clasp 18B allows for attachment of other components, such as personalization accessories.

Figure 19:
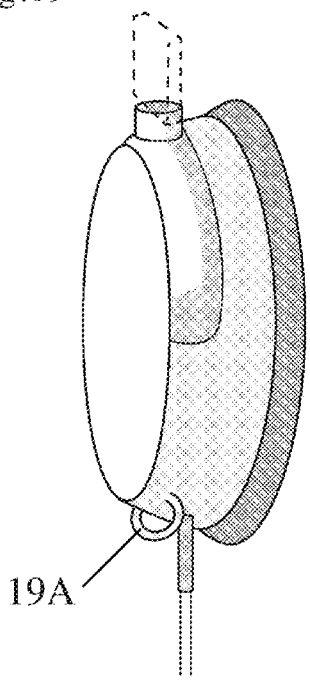
FIG. 19 is a side view of a headphone with a loop connector.

FIG. 19 illustrates loop 19A cast as part of the headphone body.

Figure 20:
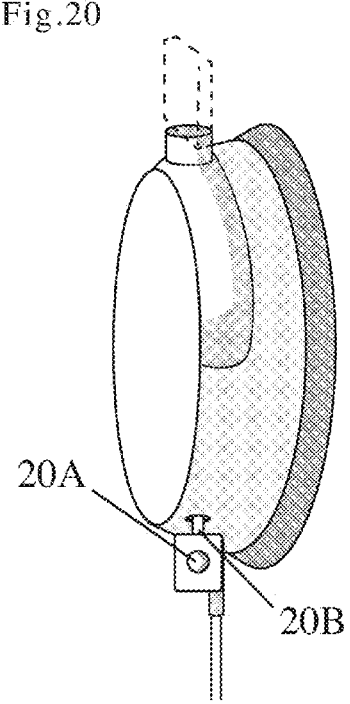
FIG. 20 is a side view of a headphone with a rotating connector.

FIG. 20 shows hole 20B accommodating a rotating connector 20A.

Figure 21:
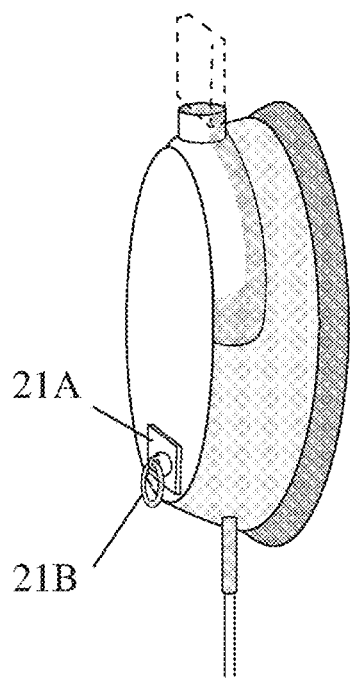
FIG. 21 is a side view of a headphone with an adhesive connector.

FIG. 21 shows an adhesive patch 21A to which attachment feature 21B is attached.

Figure 22:
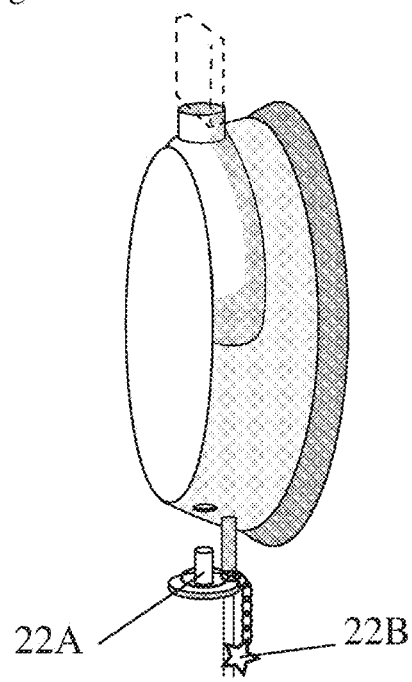
FIG. 22 is a side view of a headphone with a plug attachment.

FIG. 22 shows a plug 22A securing a personalization accessory 22B (e.g., star charm) with the use of a ring.

Figure 23:
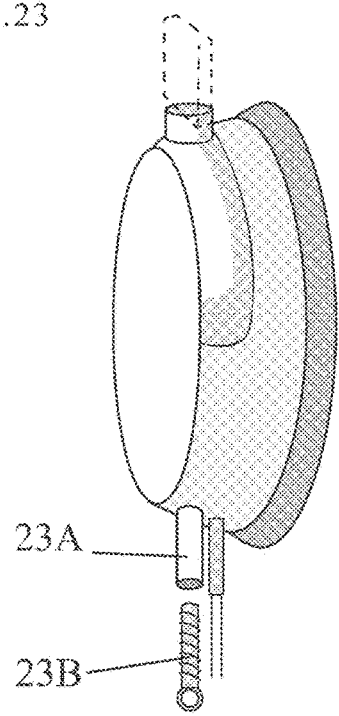
FIG. 23 is a side view of a headphone with an alternative male-female connector.

FIG. 23 illustrates the converse of the male-female connector illustrated in FIG. 13. The female 23A is attached to the headphone, while the corresponding male post 23B is threaded for secure attachment.

Figure 24:
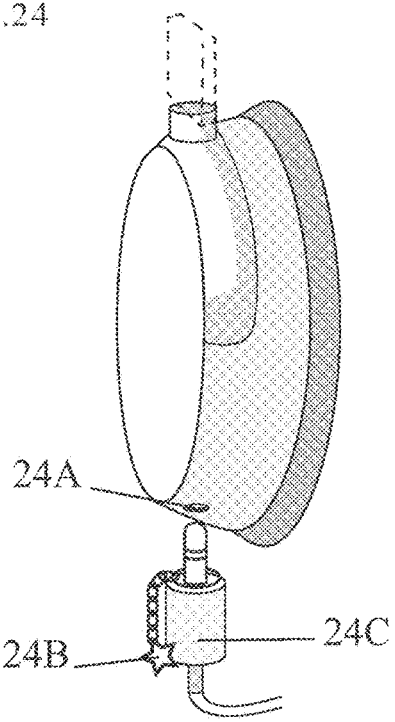
FIG. 24 is a side view of a headphone with a plug attachment.

FIG. 24 shows a headphone jack 24C onto which a personalization accessory 24B attached to a ring is placed. Headphone jack 24B may then be attached to corresponding female headphone jack receptacle 24A.

Figure 25:
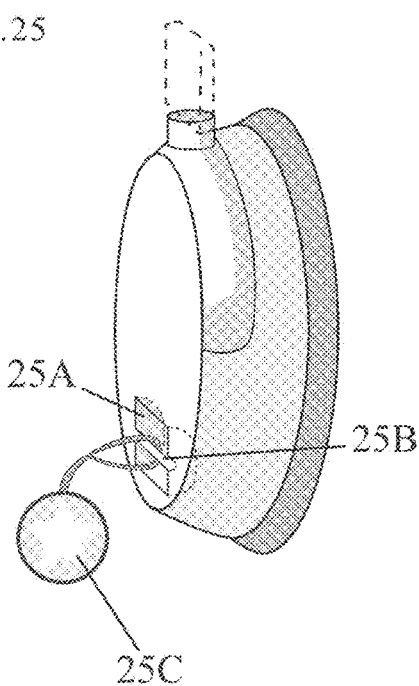
FIG. 25 is a side view of a headphone with a cavity and bar anchor.

FIG. 25 shows a cavity 25A with a bar anchor 25B. Charm 25C is attached using a string.

Figure 26:
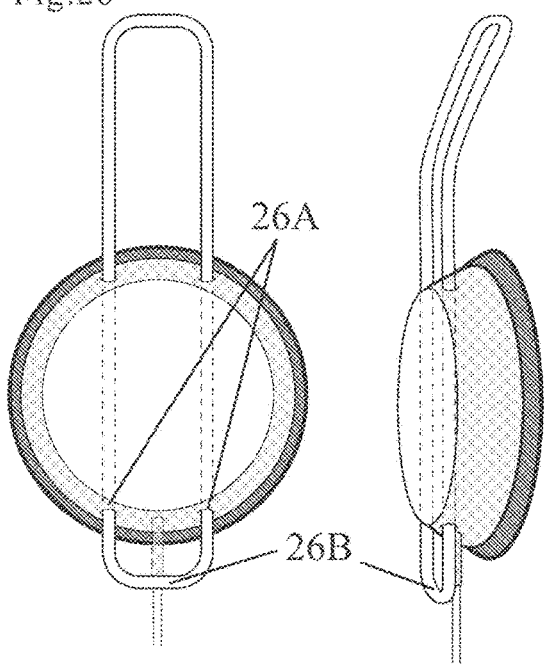
FIG. 26 is a side view of a headphone with a wire cavity attachment from 2 angles.

FIG. 26 shows the side view and profile view of headphones that attach to the headband 26A going through headphones. The method creates a loop 26B at that allows the attachment of accessories. This would be similar to the loop of FIG. 19.

Figure 27:
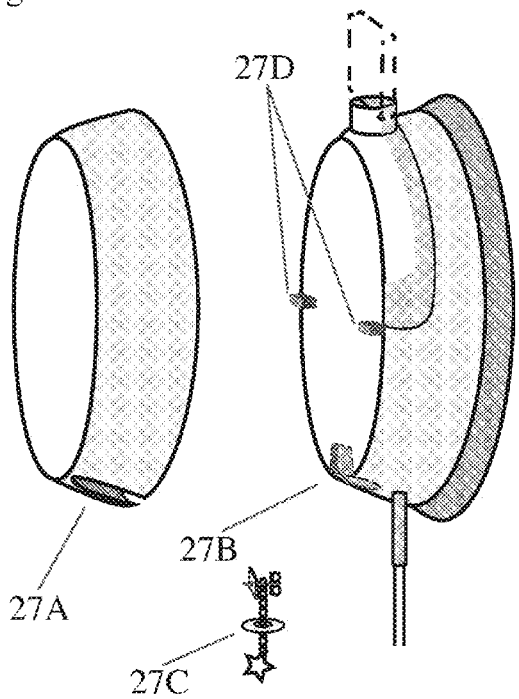
FIG. 27 is a side view of a headphone that may be detachably secured via securing means to a detachable, customizable cover configured to allow an accessory to attach to the headphone.

FIG. 27 is a side view of a headphone that may be detachably secured via securing means 27D to a detachable, customizable cover 27A configured to allow an accessory 27C to attach to a corresponding anchoring portion 27B of the headphone. Cover 27A may be customized in terms of color(s) and shape. Any type of design element (e.g., decals, logos, embossing) known in the art may be displayed on a surface of the cover 27A. Means 27D used to secure cover 27A to the headphone may include magnets, snaps, magnetic snaps, and any other suitable securing means known in the art for attaching a cover to a headphone. The cover 27A may also act to secure the accessory 27C to be anchored to an anchoring portion 27B on the headphone. The accessory 27C may include an anchoring component that may allow for use with standard earring components. While anchoring components may vary in design, an exemplary anchoring component maintains the position of the accessory 27C in relation to the headphone. Standard earring components may include any and all earring-like accessories not limited to what is normally worn on a user's ears. Such an anchoring system may enhance the ability of the consumer to customize the headphones.

Figure 28:
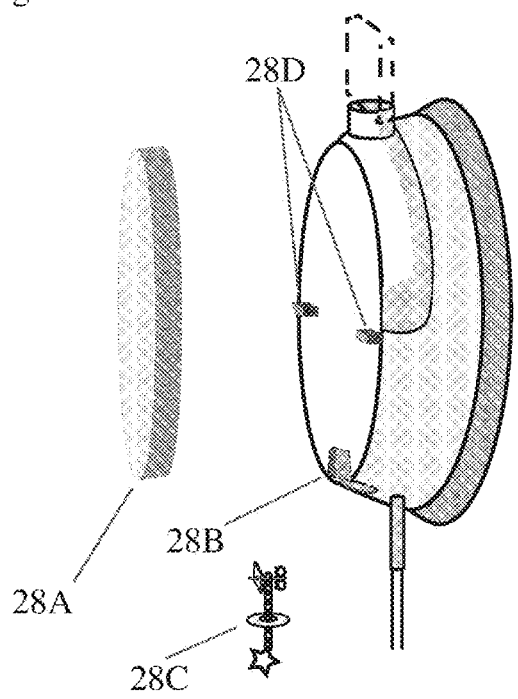
FIG. 28 is a side view of a headphone that may be detachably secured via securing means to an alternative detachable, customizable cover configured to allow an accessory to attach to the headphone.

FIG. 28 is a side view of a headphone that may be detachably secured via securing means 28D to an alternative detachable, customizable cover 28A configured to allow an accessory 28C to attach to a corresponding anchoring portion 28B of the headphone. Similar to the cover 27A illustrated in FIG. 27, cover 28A may be customized with various colors, designs, shapes, etc.

Figure 29:
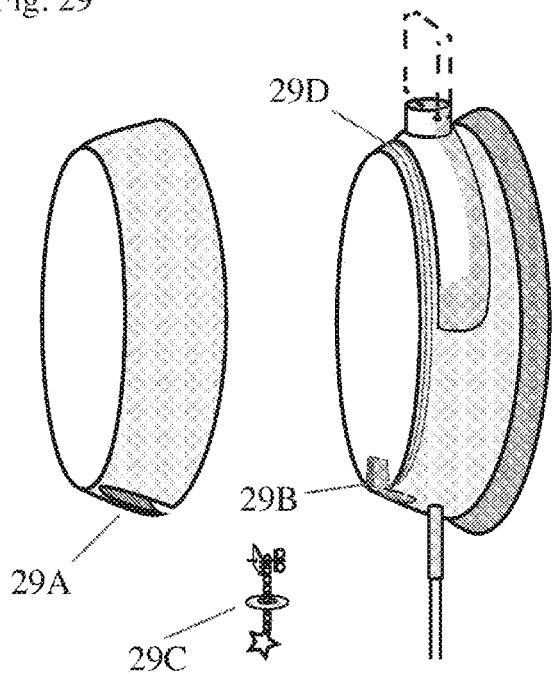
FIG. 29 is a side view of a headphone that may be detachably secured via threaded securing means to a detachable, customizable cover configured to allow an accessory to attach to the headphone.

FIG. 29 is a side view of a headphone that may be detachably secured via threaded securing means 29D to a detachable, customizable cover 29A configured to allow an accessory 29C to attach to a corresponding anchoring portion 29B of the headphone. The threaded securing means 29D may additionally include ribbing or other means of creating friction with cover 29A (which may also have similar or corresponding threading or other feature that enhances friction). Such friction should be such that would allow for releasable attachment. Such threaded securing means 29D may allow for attachment with cover 29A via twisting, screwing, pressing, pop-off, and other means of attachment involving friction.

Figure 30:
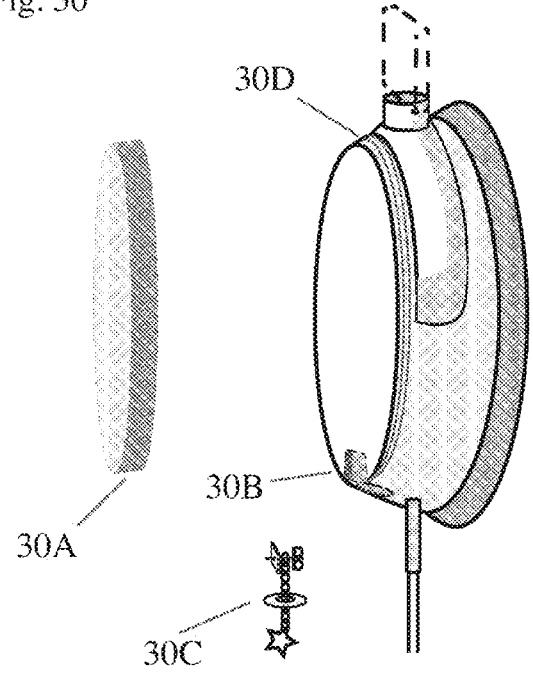
FIG. 30 is a side view of a headphone that may be detachably secured via threaded securing means to an alternative detachable, customizable cover configured to allow an accessory to attach to the headphone.

FIG. 30 is a side view of a headphone that may be detachably secured via threaded securing means 30D to an alternative detachable, customizable cover 30A configured to allow an accessory 30C to attach to a corresponding anchoring portion 30B of the headphone. The attachment relationship between threaded securing means 30D and corresponding cover 30A may be similar to that between securing means 29D and cover 20A described with respect to FIG. 29.

Figure 31:
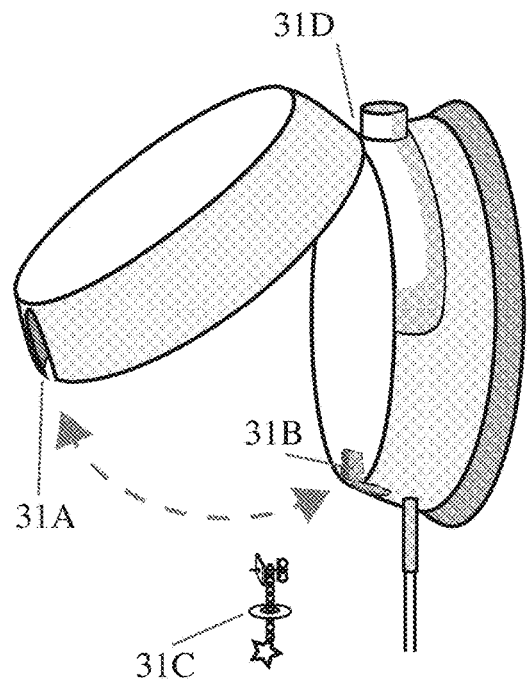
FIG. 31 is a side view of a headphone that may be detachably secured via hinged securing means to an alternative detachable, customizable cover configured to allow an accessory to attach to the headphone.

FIG. 31 is a side view of a headphone that may be detachably secured via hinged securing means 31D to an alternative detachable, customizable cover 31A configured to allow an accessory 31C to attach to a corresponding anchoring portion 31B of the headphone. While the hinged securing means 31D is illustrated as opening and closing along one axis, various type of hinges may be possible that allow for different types of opening and closing (e.g., pivoting, rotating).

Figure 32:
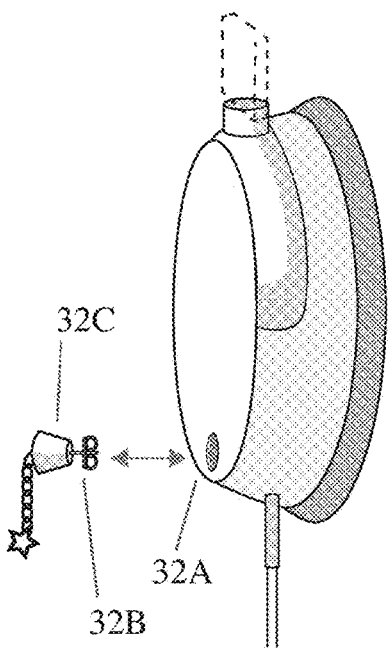
FIG. 32 is a side view of a headphone and an accessory that may be secured to the headphone via an adapter anchoring system.

FIG. 32 is a side view of a headphone and an accessory that may be secured to the headphone via an adapter anchoring system (32A-C collectively). An exemplary anchor 32C, which may vary in design, may be associated with an accessory (and attachment earring feature 32B) and may be inserted into a corresponding opening 32A on the headphone. The opening 32A and corresponding anchor 32C may vary in size, position or location relative to the headphone. As can be seen from the illustrated use with earring-like accessories, the anchoring system may be compatible with a variety with earrings currently on the market.

Figure 33:
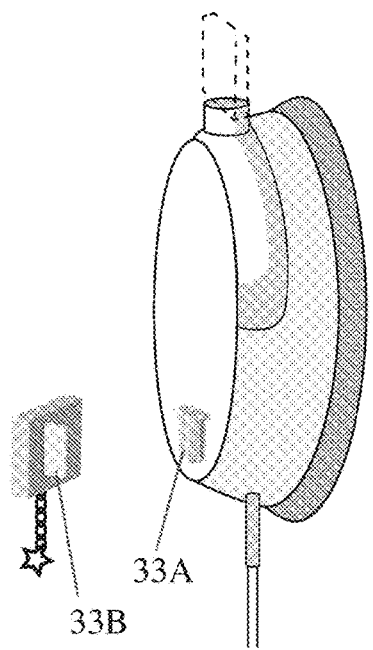
FIG. 33 is a side view of a headphone and an accessory that may be secured to the headphone via a detachable anchor having a rail system.

FIG. 33 is a side view of a headphone and an accessory that may be secured to the headphone via a detachable anchor having a rail system (33A and 33B collectively). While the illustrated embodiment shows a rail 33B associated with the anchor and accessory and a corresponding opening 33A on the headphone, the positions may also be reversed.

Figure 34:
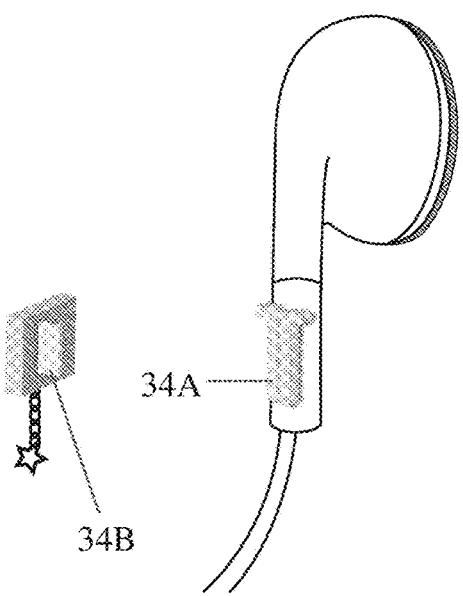
FIG. 34 is a side view of an ear bud and an accessory that may be secured to the headphone via a detachable anchor having a rail system.

FIG. 34 is a side view of an ear bud and an accessory that may be secured to the headphone via a detachable anchor having a rail system (34A and 34B collectively).

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for providing a customized headphone, the method comprising:
   providing a point of anchor in the headphone, wherein the point of anchor comprises a hole in the headphone;
   providing an attachment feature, wherein at least a portion of the attachment feature fits into the hole in the headphone when the attachment feature is permanently attached to the headphone; and
   providing a personalization accessory that attaches to the attachment feature, the attachment feature allows for removable attachment of the personalization accessory that hangs substantially vertically from the permanent attachment feature to allow for display of the personalization accessory when the personalization accessory is attached to the attachment feature and when the headphone is worn by a person.

2. The method of claim 1, wherein the headphone circumscribes at least a portion of an outer ear of an individual wearing the headphone.

3. The method of claim 1, wherein the point of anchor is on at least one of a bottom portion, a top portion, and a side portion of the headphone.

4. The method of claim 3, wherein the attachment feature is permanently attached to the headphone by inserting the portion of the attachment feature into the hole.

5. The method of claim 1, wherein providing the attachment feature comprises permanently attaching the attachment feature to the headphone with an adhesive.

6. The method of claim 1, wherein providing the attachment feature comprises permanently attaching the attachment feature to the headphone to the point of anchor, wherein the attachment feature includes a ring.

7. The method of claim 1, wherein the headphone is previously manufactured and the providing a point of anchor on the headphone comprises modifying the previously manufactured headphone to include the point of anchor.

8. The method of claim 1, wherein the headphone is an earphone.

9. The method of claim 1, wherein the attachment feature includes at least one of a ring, a bulb connector, a hook, a screw, screw threads, a snap, a magnet, metal with magnetic properties, a rail, or a groove.

10. The method of claim 1, wherein the attachment feature includes at least one of a magnet or a metal piece and the removable personalization accessory attaches to the attachment feature via the at least one of the magnet or the metal piece based on a magnetic attraction.

11. The method of claim 1, wherein the attachment feature includes at least one of a rail or a groove, and wherein the removable personalization accessory attaches to the attachment feature via the at least one of the rail or groove.

12. The method of claim 1, wherein the attachment feature includes at least one of a ring or a snap connector, and wherein the removable personalization accessory attaches to the attachment feature via at least one of the ring or the snap connector.

13. The method of claim 1, wherein the personalization accessory includes a feature for attaching and removing the personalization accessory from the attachment feature.

* * * * *